US010958560B2

(12) United States Patent
Mahimkar et al.

(10) Patent No.: US 10,958,560 B2
(45) Date of Patent: Mar. 23, 2021

(54) COMMON ABSTRACTION FOR NETWORK TRAFFIC MIGRATION

(71) Applicant: AT&T Intellectual Property I, L.P., Atlanta, GA (US)

(72) Inventors: Ajay Mahimkar, Edison, NJ (US); Yikai Lin, Ann Arbor, MI (US); Zihui Ge, Madison, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/513,147

(22) Filed: Jul. 16, 2019

(65) Prior Publication Data

US 2021/0021506 A1 Jan. 21, 2021

(51) Int. Cl.
*H04L 12/751* (2013.01)
(52) U.S. Cl.
CPC .................................. *H04L 45/02* (2013.01)
(58) Field of Classification Search
CPC ....................................................... H04L 45/02
See application file for complete search history.

(56) References Cited

U.S. PATENT DOCUMENTS

| 9,338,229 B2* | 5/2016 | Branson | H04L 67/1025 |
| 10,268,980 B1* | 4/2019 | Gindin | G06Q 10/067 |
| 2015/0237527 A1* | 8/2015 | Knutson | H04L 61/203 726/4 |
| 2018/0077024 A1* | 3/2018 | Zhang | H04L 41/12 |
| 2018/0102975 A1* | 4/2018 | Rankin | H04L 47/12 |
| 2019/0265971 A1* | 8/2019 | Behzadi | G06Q 10/06 |
| 2019/0349426 A1* | 11/2019 | Smith | H04L 67/104 |
| 2020/0059494 A1* | 2/2020 | Annadata | G06F 9/5072 |
| 2020/0104404 A1* | 4/2020 | Li | G06F 9/5055 |
| 2020/0146077 A1* | 5/2020 | Li | H04W 76/10 |
| 2020/0210805 A1* | 7/2020 | Drozdowski | G06F 17/16 |

OTHER PUBLICATIONS

"Floodlight Is an Open SDN Controller"; http://www.projectfloodlight.org/floodlight/; Project Floodlight; © 2019; accessed Jul. 5, 2019; 3 pages.
"Traffic Shifting"; https://istio.io/docs/tasks/traffic-management/traffic-shifting/; Istio; accessed Jul. 5, 2019; 3 pages.

(Continued)

*Primary Examiner* — Brian D Nguyen
(74) *Attorney, Agent, or Firm* — BakerHostetler

(57) ABSTRACT

A method of migrating traffic in a network includes receiving, via an API, a request to migrate traffic. The request identifies a target around which the traffic is to be migrated and a peer to which the traffic is to be migrated. The method also includes discovering at least one anchor point based on at least a topology of the network, the target, and the peer. The method includes, based on an identity of the at least one anchor point and the target, identifying a migration mechanism. The method also includes requesting, in accordance with the migration mechanism, that the at least one anchor point facilitate migration of the traffic. The method includes responding, through the API, to the request indicating whether the migration was successful.

20 Claims, 3 Drawing Sheets

(56) References Cited

OTHER PUBLICATIONS

"BESS: Berkeley Extensible Software Switch"; https://github.com/NetSys/bess; GitHub, Inc.; © 2019; accessed Jul. 5, 2019; 2 pages.
"What's Ryu?"; https://osrg.github.io/ryu/;; Ryu SDN Framework Community; © 2017; accessed Jul. 5, 2019; 2 pages.
Araujo et al.; "Balancing on the Edge: Transport Affinity without Network State"; 15th USENIX Symposium on Networked Systems Design Implementation; Apr. 2018; p. 111-124.
Eisenbud et al.; "Maglev: A Fast and Reliable Software Network Load Balancer"; 13th USENIX Symposium on Networked Systems Design and Implementation; Mar. 2016; p. 523-535.
Gandhi et al.; "Rubik: Unlocking the Power of Locality and End-point Flexibility in Cloud Scale Load Balancing"; USENIX Annual Technical Conf.; Jul. 2015; p. 473-485.
Gandhi et al.; "Duet: Cloud Scale Load Balancing with Hardware and Software"; ACM SIGCOMM Computer Communication Review; vol. 44; 2014; 12 pages.
Gember-Jacobsen et al.; "OpenNF: enabling innovation in network function control"; ACM SIGCOMM Computer Communication Review; vol. 44; 2014; 14 pages.
"WhygRPC?"; https://grpc.io/; accessed Jul. 5, 2019; 2 pages.
Khalid et al.; "A Standardized Southbound API for VNF Management"; Proceedings of the Workshop Hot Topics in Middleboxes Network; 2016; p. 38-43.
Gude et al.; "NOX: Towards an Operating System for Networks"; ACM SIGCOMM Computer Communication Review; vol. 38; Jul. 2008; p. 105-110.
Jin et al.; "Dynamic Scheduling of Network Updates"; ACM SIGCOMM Computer Communication Review; vol. 44; 2014; 14 pages.
Liu et al.; "zUpdate: updating data center networks with zero loss"; ACM SIGCOMM Computer Communication Review; vol. 43; 2013; 12 pages.
Medved et al.; "OpenDaylight: Towards a Model-Driven SDN Controller architecture"; Proceeding of IEEE Int'l Symposium on a World of Wireless, Mobile and Multimedia Networks; 2014; 6 pages.
Miao et al.; "SilkRoad: Making Stateful Layer-4 Load Balancing Fast and Cheap Using Switching ASICs"; Proceedings of the Conf. of the ACM Special Interest Group on Data Comm.; 2017; 14 pages.
Olteanu et al.; "Stateless Datacenter Load-balancing with Beamer"; USENIX Symposium on Networked Systems Design and Implementation; vol. 18; Apr. 2018; p. 125-139.
Patel et al.; "Ananta: cloud scale load balancing"; ACM SIGCOMM Computer Communication Review; vol. 43; 2013; p. 207-218.
Sun et al.; "OFM: Optimized Flow Migration for NFV Elasticity Control"; IEEE/ACM 26th Int'l Symposium on Quality of Services; 2018; 10 pages.
Veeraraghavan et al.; "Maelstrom: Mitigating Datacenter-level Disasters by Draining Interdependent Traffic Safely and Efficiently"; USENIX Symposium on Operating Systems Design Implementation; Oct. 2018; p. 373-389.
Woo et al.; "Elastic Scaling of Stateful Network Functions"; USENIX Symposium on Networked Systems Design and Implementation; Apr. 2018; p. 299-312.

* cited by examiner

COMMON ABSTRACTION FOR NETWORK TRAFFIC MIGRATION

TECHNICAL FIELD

The technical field relates generally to controlling network traffic and, more specifically, to systems and methods for migrating network traffic using a common abstraction.

BACKGROUND

Traffic migration is a common procedure performed by operators during network outages, caused by planned maintenance and unexpected incidents, to prevent service disruptions. However, current practices of traffic migration often couple operators' intentions (e.g. device upgrades) with network setups (e.g. load-balancers), resulting in poor reusability and substantial operational complexities.

A need exists for generalizing traffic migration with a unified abstraction.

SUMMARY

This disclosure is directed to a traffic migration system built upon a unified traffic migration model. This system may abstract away intricate configuration details through generic interfaces and may enable composable workflows and plug-and-play through modularization. Leveraging a novel mask-based representation of configurations, this system may reduce operational complexity by minimizing externally maintained states and improve management efficiency by allowing task interleaving.

In an aspect, this disclosure is directed to a method of migrating traffic in a network using a common abstraction. The method may include receiving, via an application programming interface (API), a request to migrate traffic, the request identifying a target around which the traffic is to be migrated and a peer to which the traffic is to be migrated. The method may include discovering at least one anchor point based on at least a topology of the network, the target, and the peer. The method may include, based on an identity of the at least one anchor point and the target, identifying a migration mechanism. The method may include requesting, in accordance with the migration mechanism, that the at least one anchor point facilitate migration of the traffic. The method may include responding, through the API to the request indicating whether the migration was successful.

According to another aspect, this disclosure is directed to a system that may include a processor and memory storing instructions that cause the processor to effectuate operations. The operations may include receiving, via an API, a request to migrate traffic on a network from a target. The operations may include discovering at least one anchor point based on at least a topology of the network. The operations may include based on the at least one anchor point, identifying a migration mechanism. The operations may include requesting, in accordance with the migration mechanism, that the at least one anchor point facilitate migration of the traffic.

In another aspect, this disclosure is directed to non-transitory computer-readable storage medium storing instructions that, when executed by a processor, cause the processor to effectuate operations The operations may include receiving, via an API, a request to migrate traffic of a network from a target. The operations may include discovering at least one anchor point based on at least a topology of the network. The operations may include, based on the at least one anchor point, identifying a migration mechanism. The operations may include requesting, in accordance with the migration mechanism, that the at least one anchor point facilitate migration of the traffic around the target.

DETAILED DESCRIPTION

Figure 1A:
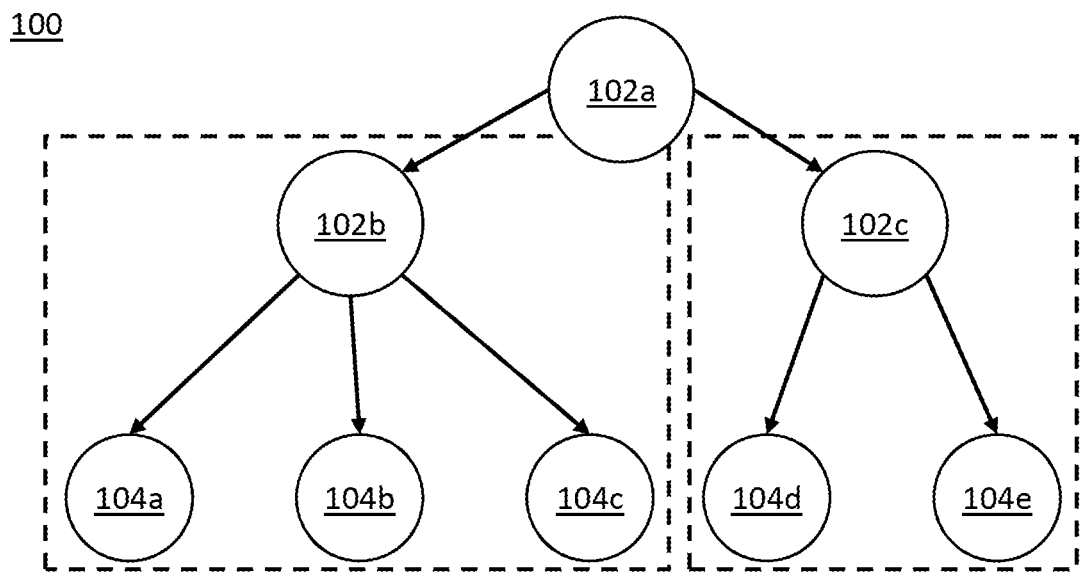
FIG. 1A is a schematic of a network in which the disclosed systems and methods may be used to migrate traffic.

FIG. 1 is a schematic of a network 100 in which the disclosed systems and methods may be used to migrate traffic. Network 100 may include networking components 102, such as data communications equipment (DCE), that controls and guides traffic through network 100. Such networking components 102 may include one or more routers, switches, bridges, hubs, firewalls, gateways, balancing nodes, access points, web servers, access points, or mobility management entities. Networking components 102 may facilitate communications with and between terminal components 104, such as end stations, user devices, data terminal equipment, smart devices, Internet of Things (IoT) devices, or other end-point nodes. Networking components 102 and terminal components 104 may be implemented as hardware-based, software-defined (virtualized), or a combination thereof.

Networking components 102 and terminal components 104 may be heterogenous groups, with varying manufacturers, protocols, configurations, and device or function types. It may be challenging to perform traffic migration on a heterogeneous data plane, because different types of network functions have (or depend on) drastically different traffic steering capabilities and methods. For example, a router (networking component 102) may drain its traffic by increasing Open Shortest Path First ("OSPF") weights of its links, but it may be incapable of controlling what flows to drain or specifying peers for the drained traffic; in contrast, a firewall (networking component 102) may rely on external functions like load balancers (networking component 102) or switches (networking component 102) to steer traffic, which do support more fine-grained controls.

These differences may lead to highly customized solutions that tailor to specific applications (e.g., disaster mitigation) or network setups (e.g., load-balancers and Open-Flow switches). Such customized solutions often require excessive knowledge of the infrastructure to develop and use (e.g., topology, device type). As network function virtualization becomes more prominent and network data plane becomes more heterogenous and dynamic, developing and using customized solutions may be undesirable due to their cost and poor reusability across applications and network functions.

A generic traffic migration model that incorporates different traffic steering capabilities and methods and is applicable across different applications may solve these and other problems. A modular traffic migration system may be built on top of this traffic migration model. The modular traffic migration system may hide details of different traffic migration capabilities and methods by providing a generic interface that allows specification of general traffic migration intentions. This traffic migration system may modularize common stages of a traffic migration workflow to enable composable workflows and allow vendors to plug-and-play. With a mask-based configuration management approach to keep track of individual traffic migration jobs, the modular traffic migration system may simplify reverse traffic migration and multiple job coordination.

Figure 1B:
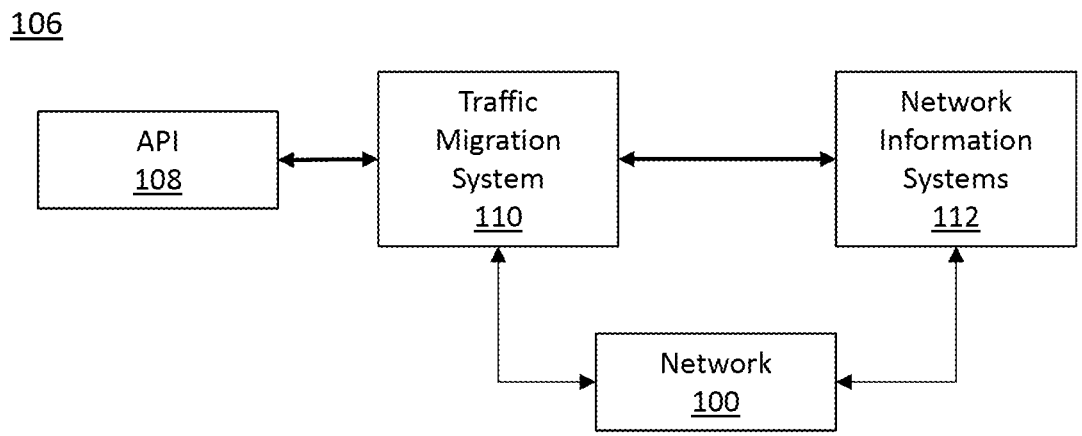
FIG. 1B is a schematic representation of the traffic migration system with the network on which traffic is migrated.

For example, FIG. 1B illustrates how such a system 106 would operate. System 106 may include an API 108 through which an operator can request traffic migration using a common abstraction. System 106 may include a traffic migration system 110 that causes a traffic migration to be implemented, implementing the specific protocol or actions necessary to complete the request based on information received from network information systems 112 (e.g., network information base, or "NIB") and interactions with network 100 on which the traffic migration is to be performed.

Figure 2:
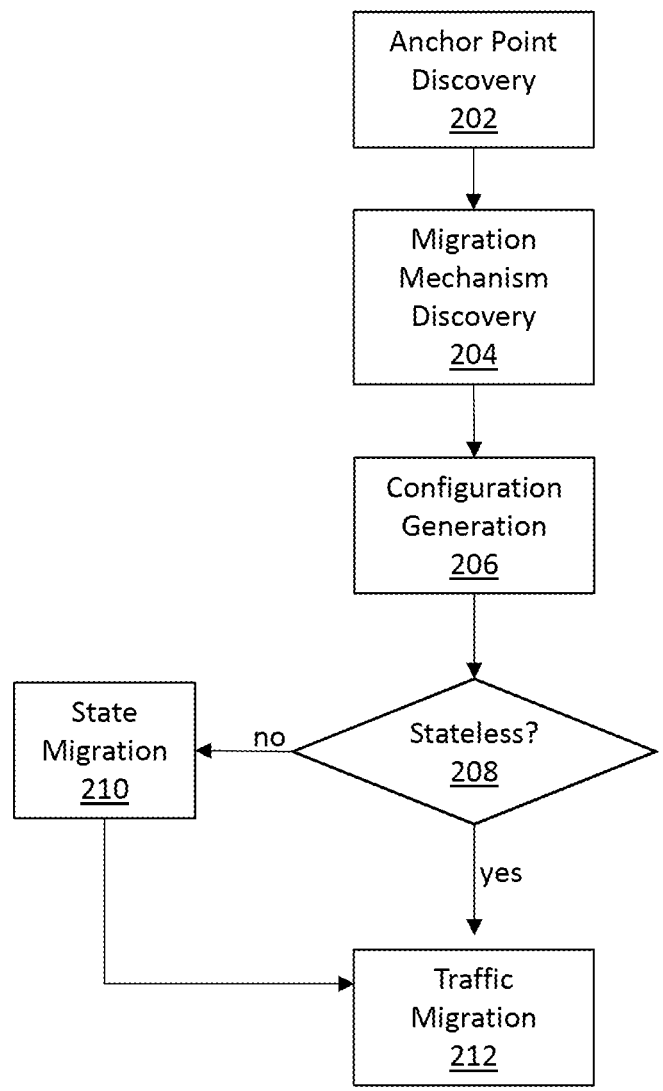
FIG. 2 is a flowchart of a method for migrating traffic.

FIG. 2 illustrates a method 200 for migrating traffic. Certain components of method 200 may be modular, so that different elements may be adapted to account for different traffic migration scenarios.

Method 200 may progress in response to receiving inputs regarding the requested traffic migration for network 100. These inputs may include one or more target(s), peer(s) weight(s) and filter(s). "Target" may refer to the network entity (e.g., networking component 102 or terminal component 104) around which traffic migration is performed. In some implementations of method 200 the input target may be the only required parameter. "Peer" may refer to a network entity that receives or sends traffic to or from the target. In each migration, the distribution of traffic among the receiving network entities may be referred to as the "weight." A "filter" may refer an identifier for any subset of the migrating traffic.

In some embodiments, the request may be received via an application API 108 that requires (or allows, as the case may be) inputs indicative of target, peer, weight, and filter. The output received by the requester via the API may simply be an indication of whether the requested traffic migration was successfully implemented.

At step 202, method 200 may include anchor point discovery. An anchor point may be a networking component 102 that is capable of altering the distribution of traffic to other networking components 102 as dictated by certain tunable policies. Common anchor points are load balancers, DNS servers and switches. From an operator's perspective, what and where the anchor points are has nothing to do with the expression of traffic migration intentions. However, the selection of anchor points may play a role in traffic migrations in terms of performance and service impact. Step 202 leverages network topology information (e.g., topology information related to network 100), which may be stored in NIB 110 or other information systems, such as those found in certain software defined network or network virtualization functions (SDN-NVF) platforms.

Anchor points may be upstream of the target. For example, referring to FIG. 1A, if the target is 104a, then anchor points that may be capable of migrating traffic directed to component 104a to component 104b and 104c may include component 102b. In some implementations, identifying anchors may be done by identifying parent components of the target (and peer(s), if applicable) and their closest common ancestor. Using our previous example, common parents of components 104a, 104b, and 104c include components 102a and 102b. Since component 102b is the closest ancestor, component 102b may be the anchor.

At step 204, method 200 may include migration mechanism discovery. This can include determining whether the migration request is for active migration and passive migration. The difference between active migration and passive migration is whether the migration is to be performed by the target or by an anchor point. Active migrations require directly reconfiguring the target to steer traffic. For example, MMEs may rely on base stations to actually redirect the traffic, but the operator does not directly reconfigure the base stations; thus, MMEs migrate traffic actively. Passive migrations are performed by using an external component—the anchor—to migrate traffic around the target.

The migration mechanism may also be based on a function or other characteristic of the anchor point. For example, if the anchor point is a router, the migrating mechanism may be based on the OSPF routing protocol, Border Gateway Protocol (BGF). In another example, the migration mechanism may be based on a Domain Name System (DNS) protocol, such as for DNS server anchor points, load-balancing (LB) protocol, such as for load balancer anchor points. Internet protocol (IP) and software-based protocols may also be used. The protocol may be provided by the manufacturer of the anchor point.

Migration may include multiple steps. For example, if the target is component 104a and the peer (to which the traffic is to be migrated) is component 104e, migration mechanisms associated with component 102a and component 102c may be used. Implementing the migration may include performance of the first migration mechanism associated with component 102a and a second migration mechanism associated with component 102c.

At step 206, method 200 includes configuration generation. This step takes in the parameters from the request (e.g., the target) and the anchor point and migration information gathered at previous steps and generates actual configurations for the corresponding components of network 100. These configurations may be a single command to raise the weight of OSPF on a networking component 102 port. These configurations may be more complex, including multiple commands for multiple networking components 102. Step 206 may include interacting with a network information base to confirm whether he new configurations can be deployed on network 100 based on existing configurations and update the existing configurations.

Stateful network components may require extra steps during traffic migration. Thus, at step 208, a determination is made whether the network components are stateless. If not, then method 200 proceeds to step 210 to perform state migration. State migration may include preserving state information and avoiding service disruption.

At step 212, the configuration generated at step 206 is deployed to migrate traffic in accordance with the request.

Traffic migration may be a precursor to reverse traffic migration, in which migrated traffic is brought back to the target. This may occur in cases such as device upgrades and disaster mitigation. Instead of requiring the operator record what was changed during traffic migration then recomputing new configurations to revert the previous ones, masked-based configuration management can streamline this process from the operator's perspective.

For example, considering a three-port load balancer. Each mask (representing a traffic migration intention) consists of weights indicating the percentage of traffic to send to each port. Masks are put on top of one another into a stack, at the bottom of which is the base mask denoting the default configuration of the load balancer. The current (actual) configuration is calculated by applying all masks to the base.

In this example, the base mask is {30%, 30%, 40%}, indicating by default 30% of traffic goes out of port 1 and so on. In this example, a new traffic migration job comes in with the intention to migrate traffic from port 1 to 2 and 3 (because the target connected to port 1 uses passive migration), a new mask {−100%, 50%, 50%} is put on top of base resulting in a new configuration {0%, 45%, 55%}. New masks always go to the top of the stack, while existing masks can be removed from anywhere. Whenever such a change happens, the current configuration is recalculated automatically. With each mask being tracked, reverse traffic migration becomes as simple as removing the mask.

The network information base may determine whether a new configuration can be deployed onto network 100 based on existing configurations. This may include detecting conflicts in masks. Considering the ongoing example, a second traffic migration job may come in with the intention to migrate traffic from port 2 to 1 and 3, which clearly conflicts with the existing job (migrating traffic from port 1 to 2 and 3, represented by mask 1) whose intention was to migrate traffic away from port 1. As a result, the original mask {50%, −100%, 50%} may be rejected, and an alternative mask {0%, −100%, 100%} may be generated. The actual configuration then becomes {0%, 0%, 100%}, so that all traffic handled by the three-port load balancer uses port 3. If an alternative mask is not generated (either because it is practically impossible, or because of operator's policy), the API call will fail.

Mask-based configuration management may also handle runtime failures. Sometimes the operator may readjust the default configuration of a network component, or more often, a failure happens rendering the existing configuration obsolete (e.g., the number of available ports decreases because of a failed link). These situations can be easily handled by updating the base, either proactively by the operator or automatically through common topology discovery mechanisms.

Figure 3:
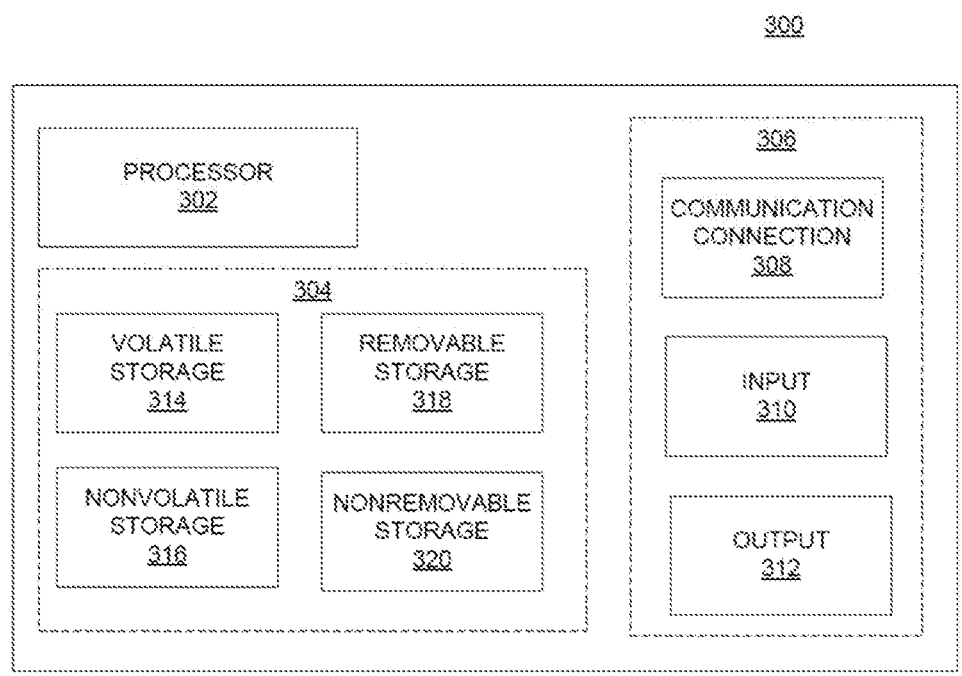
FIG. 3 is a schematic of a network device.

FIG. 3 is a schematic of an exemplary network device 300. Components 102, 104 of network 104 and system 106 may be implemented using one or more network devices 300. Network device 300 may comprise hardware or a combination of hardware and software. The functionality to facilitate telecommunications via a telecommunications network may reside in one or combination of network devices 300. Network device 300 depicted in FIG. 3 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an automatic location function server (ALFS), a gateway mobile location center (GMLC), a radio access network (RAN), a serving mobile location center (SMLC), or the like, or any appropriate combination thereof. It is emphasized that the block diagram depicted in FIG. 3 is exemplary and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength. As evident from the description herein, network device 300 is not to be construed as software per se.

In addition to processor 302 and memory 304, network device 300 may include an input/output system 306. Processor 302, memory 304, and input/output system 306 may be coupled together (coupling not shown in FIG. 3) to allow communications between them. Each portion of network device 300 may comprise circuitry for performing functions associated with each respective portion. Thus, each portion may comprise hardware, or a combination of hardware and software. Accordingly, each portion of network device 300 is not to be construed as software per se. Input/output system 306 may be capable of receiving or providing information from or to a communications device or other network entities configured for telecommunications. For example input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a non-removable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

As described herein, a telecommunications system wherein management and control utilizing a software designed network (SDN) and a simple IP are based, at least in part, on user equipment, may provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple M2M devices—through enhanced wireless management.

While examples of a telecommunications system in which traffic migration requests can be processed and managed have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes an device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a network as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

While traffic migration has been described in connection with the various examples of the various figures, it is to be understood that other similar implementations may be used or modifications and additions may be made to the described examples of a network without deviating therefrom. For example, one skilled in the art will recognize that a network 100 as described in the instant application may apply to any environment, whether wired or wireless, and may be applied to any number of such devices connected via a communications network and interacting across the network. Therefore, a telecommunications system as described herein should not be limited to any single example, but rather should be construed in breadth and scope in accordance with the appended claims.

In describing preferred methods, systems, or apparatuses of the subject matter of the present disclosure—traffic migration—illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose. In addition, the use of the word "or" is generally used inclusively unless otherwise provided herein.

This written description uses examples to enable any person skilled in the art to practice the claimed subject matter, including making and using any devices or systems and performing any incorporated methods. The patentable scope is defined by the claims, and may include other examples that occur to those skilled in the art (e.g., skipping steps, combining steps, or adding steps between exemplary methods disclosed herein). Such other examples are intended to be within the scope of the claims if they have structural elements that do not differ from the literal language of the claims, or if they include equivalent structural elements with insubstantial differences from the literal languages of the claims.

What is claimed:

1. A method of migrating traffic in a network, the method comprising:
   receiving, via an application programming interface (API), a request to migrate traffic, the request identifying a target around which the traffic is to be migrated and a peer to which the traffic is to be migrated;
   discovering at least one anchor point based on at least a topology of the network, the target, and the peer;
   identifying a migration mechanism based on a characteristic of the at least one anchor point;
   requesting, in accordance with the identified migration mechanism, that the at least one anchor point facilitate migration of the traffic; and responding, through the API, to the request indicating whether the migration was successful.

2. The method of claim 1, wherein the API comprises a common abstraction for traffic migration.

3. The method of claim 1, wherein the identified migration mechanism comprises at least one of an internet protocol (IP)-based mechanism, domain name system (DNS)-based mechanism, load balancer-based mechanism or application-controlled mechanism.

4. The method of claim 1, wherein discovering the at least one anchor point comprises selecting the at least one anchor point from a plurality of anchor points based on the at least one anchor point being a closest common ancestor of the target and the peer.

5. The method of claim 1, wherein the at least one anchor point is upstream of the target and the peer.

6. The method of claim 1, wherein the target comprises a server of the network.

7. The method of claim 1, wherein the target comprises a firewall of the network.

8. The method of claim 1, wherein the at least one anchor point further comprises a second anchor point, the method further comprising:
 identifying a second migration mechanism based on the second anchor point, and
 requesting, in accordance with the identified second migration mechanism, that the second anchor point facilitate the migration.

9. A system comprising
 a processor; and
 memory storing instructions that cause the processor to effectuate operations, the operations comprising:
 receiving, via an application programming interface (API), a request to migrate traffic on a network from a target;
 discovering at least one anchor point based on at least a topology of the network;
 identifying a migration mechanism based on a characteristic of the at least one anchor point; and
 requesting, in accordance with the identified migration mechanism, that the at least one anchor point facilitate migration of the traffic.

10. The system of claim 9, wherein the API comprises a common abstraction for traffic migration.

11. The system of claim 9, wherein the identified migration mechanism comprises at least one of an internet protocol (IP)-based mechanism, domain name system (DNS)-based mechanism, load balancer-based mechanism or application-controlled mechanism.

12. The system of claim 9, wherein discovering the anchor point is further based on the target.

13. The system of claim 9, wherein the anchor point is upstream of the target.

14. The system of claim 9, wherein the target comprises a server of the network.

15. The system of claim 9, wherein the target comprises a firewall of the network.

16. The system of claim 9, wherein the at least one anchor point further comprises a second anchor point, the method further comprising:
 identifying a second migration mechanism based on the second anchor point, and
 requesting, in accordance with the identified second migration mechanism, that the second anchor point facilitate the migration.

17. A non-transitory computer-readable storage medium storing instructions that, when executed by a processor, cause the processor to effectuate operations, the operations comprising:
 receiving, via an application programming interface (API), a request to migrate traffic of a network from a target;
 discovering at least one anchor point based on at least a topology of the network;
 identifying a migration mechanism based on a characteristic of the at least one anchor point; and
 requesting, in accordance with the identified migration mechanism, that the at least one anchor point facilitate migration of the traffic around the target.

18. The non-transitory computer-readable storage medium of claim 17, wherein the API comprises a common abstraction for traffic migration.

19. The non-transitory computer-readable storage medium of claim 17, wherein the identified migration mechanism is an internet protocol (IP) mechanism.

20. The non-transitory computer-readable storage medium of claim 17, wherein the traffic migration migrates the traffic to a peer and wherein the target comprises a first server and the peer comprises a second server.

\* \* \* \* \*